United States Patent Office 2,821,526
Patented Jan. 28, 1958

2,821,526

MONOAZO DYES

Samuel N. Boyd, Jr., Salem, N. J., assignor to E. I. du Pont de Nemours and Company, Wilmington, Del., a corporation of Delaware No Drawing. Application April 12, 1955
Serial No. 500,991

5 Claims. (Cl. 260—205)

This invention relates to novel dyes and more particularly to new basic monoazo dyes suitable for dyeing "Orlon" acrylic fiber.

Recently, there has been a growing emphasis on the use of basic dyes for "Orlon" fiber or "Orlon" fiber in mixture with other fibers such as wool or cellulosic fibers. The problem which is presented is to provide such a basic dye which is suitable for rapid dyeing and which will also be stable, wash- and light-fast. Several monoazo dyes have been proposed for use on "Orlon" acrylic fiber; however, it has been found that these dyes are inferior in light-fastness or build-up properties.

This invention has as an object to provide novel basic monoazo dyes. A further object is to provide basic monoazo dyes for rapid and direct dyeing of "Orlon" acrylic fiber. A still further object is to provide stable, wash- and light-fast basic monoazo dyes suitable for the rapid dyeing of union fabrics containing "Orlon" acrylic fiber. Other objects will appear hereinafter.

These objects are accomplished by the following invention of the novel basic monoazo dyes, particularly those which are obtained by coupling a diazotized aminophenacylammonium salt with an aromatic amine. These dyes are yellow-orange to red-violet in shade and they exhibit excellent light-fastness on "Orlon" acrylic fiber. The novel dyes of the present invention are represented by the following general formula:

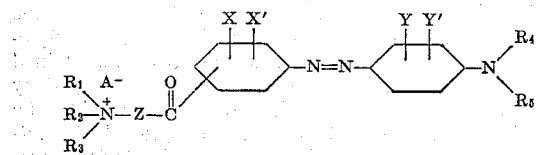

wherein $R_1$ is lower alkyl; $R_2$ is a radical selected from the group consisting of lower alkyl and hydroxyalkyl; $R_3$ is a radical selected from the group consisting of lower alkyl, hydroxyalkyl and monocyclic aralkyl and wherein $R_1$, $R_2$ and $R_3$ together with the contiguous nitrogen atom may represent a monocyclic heterocyclic group; $R_4$ is a radical selected from the group consisting of hydrogen, lower alkyl, ethanol acetylethyl, beta-cyanoethyl and phenyl; $R_5$ is a radical selected from the group consisting of hydrogen, lower alkyl and ethanol and beta-cyanoethyl; X is a radical selected from the group consisting of hydrogen, lower alkyl, chlorine, bromine and alkoxyl; X' is a radical selected from the group consisting of hydrogen, lower alkyl and chlorine, bromine; Y is a radical selected from the group consisting of hydrogen, lower alkyl, chlorine, bromine and alkoxyl; Y' is a radical selected from the group consisting of hydrogen and lower alkyl; with the proviso that when $R_1$, $R_2$, $R_3$, $R_4$ and $R_5$ are all methyl radicals at least one of the radicals taken from the group consisting of X, X', Y, and Y' is lower alkyl, alkoxyl or chlorine, bromine; Z is a radical selected from the group consisting of normal and branched alkylene groups having 1 to 3 carbons; A is an anion taken from the group consisting of organic and inorganic anions which renders the dye soluble in water and wherein the

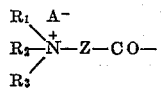

grouping is in meta or para position to the azo linkage.

This application is a continuation-in-part of application Serial No. 427,379, which was abandoned June 13, 1955.

The following examples will better illustrate the nature of the present invention, however, the invention is not intended to be limited to these examples.

EXAMPLE I 1500 ml. of an aqueous solution containing 219 grams of p-aminophenacyl-trimethyl ammonium chloride and 500 ml. of 36% aqueous hydrochloric acid is cooled to 0–5° C. by the addition of ice, and the amine is diazotized by the addition of 66.3 grams of sodium nitrite (as a 34.5% aqueous solution). An excess of nitrous acid is maintained in the solution for 30 min. (potassium iodide-starch test paper) and is then removed by the addition of a small amount of sulfamic acid. To the solution then is added 176 grams m-chloro-N,N-diethylaniline, followed by 100 grams sodium acetate trihydrate. The mixture is stirred at 0–10° C. while 400 ml. of 30% aqueous sodium hydroxide are added slowly over a period of 2.5 hours. The mixture is stirred an additional 2.5 hours at 0–10° C., and then for 16 hours, without cooling. The pH of the mixture is adjusted to 5.5 by the addition of aqueous sodium hydroxide, and the product is isolated by filtration. The filter cake is reslurried with 1000 ml. of water, heated to 90° C., and filtered hot. The filtrate is stirred and allowed to cool to room temperature. 100 grams of sodium chloride are added, stirring is continued for 1 hour, and the product is isolated by filtration and dried in a vacuum oven at 50° C. The product is a red-brown powder which dissolves readily in warm water to give a red-orange solution. "Orlon" acrylic fiber is dyed a red-orange shade from a neutral dye bath at the boil. The dye obtained has the formula

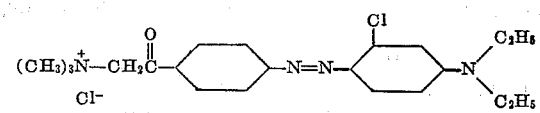

EXAMPLE II

A solution of 74 grams of p-acetaminophenacyltrimethyl ammonium chloride in 400 ml. water and 200 ml. of 36% aqueous hydrochloric acid is heated at the boil for 0.5 hour to effect hydrolysis of the acetyl group. The resulting solution is stirred and cooled with ice to 0–5° C., and the amine is diazotized by the addition of 19 grams of sodium nitrite (as a 34.5% aqueous solution). Excess nitrous acid is maintained in the solution at 0–10° C. for 0.5 hour and is then removed by the addition of sulfamic acid. To the solution is added, successively, 44 grams of N,N-diethyl-m-toluidine and 200 grams of sodium acetate trihydrate. Stirring is continued for 1 hour at 0–10° C. and an additional 60 grams of sodium acetate trihydrate are added. Stirring is continued for 8 hours at room temperature, and the mixture is filtered. The product, after drying, is a dark brown powder which dissolves readily in warm water to give a red solution. "Orlon" acrylic fiber is dyed in red shades from a neutral dye bath at the boil. The compound obtained has the formula

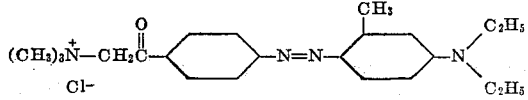

EXAMPLE III

A solution of 12 grams of p-acetaminophenacyl-pyridinium chloride in 100 ml. of water and 50 ml. 36% aqueous hydrochloric acid is heated at the boil for 0.5 hour to effect hydrolysis of the acetyl group. Ice is added to give a total volume of 500 ml., and the amine is diazotized by the addition of 2.9 grams sodium nitrite (as a 34.5% aqueous solution). After stirring for 0.5 hour at 0–10° C., excess nitrous acid is destroyed by the addition of sulfamic acid, and 8.4 grams of N,N-diethyl-m-toluidine and 60 grams of sodium acetate are added successively. The mixture is stirred at 0–10° C. for 3 hours, and at the ambient temperature for 8 hours, then filtered and the residue is dried. The product is a dark brown powder which gives dyeings on "Orlon" acrylic fiber with shade and fastness properties comparable to those shown by the product of Example II. The product of this example has the formula

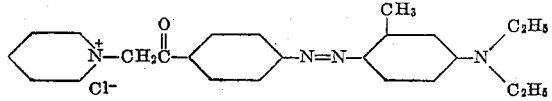

EXAMPLE IV 200 ml. of an aqueous solution containing 22.8 grams of p-aminophenacyl-trimethyl ammonium chloride and 52 ml. of 36% aqueous hydrochloric acid is cooled to 0–5° C. by the addition of ice, and the amine is diazotized by the addition of 6.9 grams of sodium nitrite (as 34.5% aqueous solution). An excess of nitrous acid is maintained in the mixture for 0.5 hour, and is then destroyed by the addition of a small amount of sulfamic acid. To the solution is added, successively, 12.2 grams 2,5-dimethylaniline and 80 grams sodium acetate trihydrate. Stirring is continued at 0–10° C. for 3 hours, followed by 8 hours without cooling. The mixture is rendered alkaline (positive reaction to Brilliant Yellow paper) by the addition of sodium hydroxide, heated to 60° C., and filtered. The filtrate is neutralized with acetic acid, and salted with 10% by weight of sodium chloride. The product is isolated by filtration and dried at 50–60° C. to yield a brown powder which dissolves in water to give an orange solution. The product dyes "Orlon" acrylic fiber in orange shades and is represented by the formula

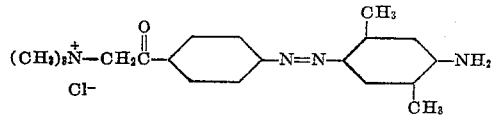

EXAMPLE V

An aqueous solution of 13.8 grams of p-acetamino-phenacylbenzyldimethylammonium chloride in 100 ml. water and 50 ml. of 36% hydrochloric acid is heated at the boil for 0.5 hour, iced to 0° C., and diazotized by the addition of 2.76 grams of sodium nitrite (as a 34.5% aqueous solution). An excess of nitrous acid is maintained in the mixture for 20 min., and is then destroyed by the addition of a small amount of sulfamic acid. To the solution at 10° C. is added 7.4 grams of m-chloro-N,N-diethylaniline, followed by 140 grams sodium acetate trihydrate. The mixture is stirred 2 hours at 0–10° C., then 16 hours at the ambient temperature. The product is removed by filtration and is dried at 50–60° C. to a brown powder which dissolves in water to give a red-orange solution. This product dyes "Orlon" acrylic fiber from a neutral aqueous dye bath to give red-orange dyeings similar to those obtained with the product of Example I. The product has the formula

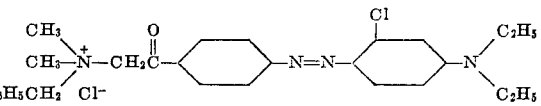

When the m-chloro-N,N-diethylaniline of this example is replaced with 6.6 grams of N,N-diethyl-m-toluidine, a red dye is obtained which when applied to "Orlon" acrylic fiber produces dyeings of comparable shade and fastness properties to the product of Example II.

EXAMPLE VI

A solution of 12 grams of p-acetaminophenacyldimethyl (beta-hydroxyethyl) ammonium chloride in 100 ml. of water and 50 ml. of 36% hydrochloric acid is heated at the boil for 0.5 hour, iced to 0° C., and diazotized by the addition of 2.76 grams of sodium nitrite (as a 34.5% aqueous solution). An excess of nitrous acid is maintained in the mixture for 20 minutes, and is then destroyed by the addition of a small amount of sulfamic acid. To the solution at 10° C. is added 7.4 grams of m-chloro-N,N-diethylaniline, followed by 140 grams of sodium acetate trihydrate. The mixture is stirred for 2 hours at 0–10° C., then for 16 hours without cooling. The product is isolated by filtration and dried to give a brown powder which dissolves in water to give a red-orange solution. When applied to "Orlon" from a neutral aqueous dye bath orange shades are obtained similar to those obtained with the product of Example I. The product of this example has the formula

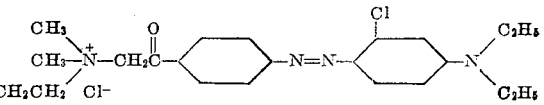

When the m-chloro-N,N-diethylaniline is replaced with 6.6 grams of N,N-diethyl-m-toluidine a product is obtained which dyes "Orlon" acrylic fiber from a neutral aqueous dye bath in red shades, similar to those obtained with the product of Example II.

EXAMPLE VII 100 ml. of an aqueous solution containing 6.4 grams of p-aminophenacyltrimethyl ammonium chloride and 6.0 ml. of 10 N aqueous hydrochloric acid are mixed and cooled to 0–5° C. The amine is diazotized by the addition of 2.2 grams of sodium nitrite (as a 5 N aqueous solution), and an excess of nitrous acid is maintained in the mixture for 30 minutes, and is then destroyed by the addition of a small amount of sulfamic acid. To the solution at 0–5° C., is added 6.0 grams of N,N-di(beta-cyanoethyl)-m-toluidine in 41 mol. of 36% aqueous hydrochloric acid solution during a 15 minute period. The solution is stirred for 16 hours during which time it is allowed to warm to room temperature. Then 74 grams of sodium acetate are added and stirring is continued for an additional 2 hours. The product is removed by filtration and dried at 50–60° C. to yield an orange powder which dissolves readily in warm water to give an orange solution. It dyes "Orlon" acrylic fiber in orange shades from a neutral dye bath at the boil, and has the formula

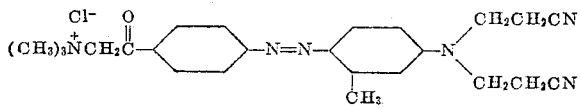

EXAMPLE VIII

In a similar manner, the following cationic dyes were prepared.

|  | Diazo Component | Coupling Component | Color on "Orlon" Acrylic Fiber |
|---|---|---|---|
| (a) | p-aminophenacyltrimethyl ammonium chloride. | m-toluidine | orange. |
| (b) | ----do---- | 2,6-dimethylaniline | yellow-orange. |
| (c) | ----do---- | 3,5-dimethylaniline | yellow-brown. |
| (d) | ----do---- | 2-methoxy-5-methylaniline | Do. |
| (e) | ----do---- | 5-chloro-o-toluidine | yellow. |
| (f) | ----do---- | N-ethyl-o-toluidine | red-orange. |
| (g) | ----do---- | N-beta-cyanoethylaniline | orange. |
| (h) | ----do---- | N-beta-cyanoethyl-o-toluidine | Do. |
| (i) | ----do---- | N-beta-cyanoethyl-m-toluidine | red-orange. |
| (j) | ----do---- | N-methyldiphenylamine | Do. |
| (k) | ----do---- | N,N-di(beta-hydroxyethyl) aniline | orange. |
| (l) | ----do---- | N,N-di(beta-hydroxyethyl)-m-toluidine | red. |
| (m) | ----do---- | N-beta-cyanoethyl-N-methylaniline | orange. |
| (n) | ----do---- | N-beta-cyanoethyl-N-ethylaniline | Do. |
| (o) | ----do---- | N-beta-cyanoethyl-N-beta-hydroxyethylaniline. | Do. |
| (p) | ----do---- | N,N-di(beta-cyanoethyl) aniline | Do. |
| (q) | ----do---- | N-beta-cyanoethyl-N-beta-hydroxyethyl-m-toluidine. | red. |
| (r) | ----do---- | N-beta-chloroethyl-N-ethylaniline | orange. |
| (s) | (3-amino-4-methylphenacyl)trimethyl-ammonium chloride. | N,N-dimethylaniline | Do. |
| (t) | ----do---- | m-chloro-N,N-dimethylaniline | Do. |
| (u) | ----do---- | N,N-diethyl-m-toluidine | yellow-brown. |
| (v) | (3-amino-4-methoxy-phenacyl) trimethyl-ammonium chloride. | N,N-dimethylaniline | orange. |
| (w) | ----do---- | m-chloro-N,N-dimethylaniline | red-orange. |
| (x) | (4-amino-3-bromo-phenacyl) trimethyl-ammonium chloride. | ----do---- | red. |
| (y) | ----do---- | m-chloro-N,N-diethylaniline | Do. |
| (z) | ----do---- | N,N-diethyl-m-toluidine | red-violet. |
| (aa) | ----do---- | N,N-dimethylaniline | red. |
| (bb) | (4-amino-3,5-dibromophenacyl) trimethylammonium chloride. | m-chloro-N,N-dimethylaniline | Do. |
| (cc) | ----do---- | m-chloro-N,N-diethylaniline | Do. |
| (dd) | ----do---- | N,N-diethyl-m-toluidine | red-violet. |
| (ee) | ----do---- | N,N-dimethylaniline | red. |
| (ff) | (4-amino-2-chloro-phenacyl) trimethyl-ammonium chloride. | m-chloro-N,N-diethylaniline | red-orange. |
| (gg) | ----do---- | N,N-diethyl-m-toluidine | red. |
| (hh) | (4-amino-2,5-dimethylphenacyl) trimethylammonium chloride. | N,N-dimethylaniline | red-orange. |

The phenacyl intermediates employed in the above examples were prepared in the following manner.

EXAMPLE IX (a) *Preparation of p-acetaminophenacyl chloride*

A mixture of 180 grams of acetanilide, 269 grams of chloroacetyl chloride and 1250 grams sym.-tetra chloroethane is stirred at temperatures below 60° C. while 630 grams anhydrous aluminum chloride are added in small portions over a 2-hour period. The mixture is heated at 58–62° C. for 2 hours and is drowned on sufficient crushed ice to insure the presence of floating ice in the final mixture. The mixture is filtered and washed with cold water until the filter cake is essentially free of sym.-tetra-chloroethane and the washings give a negative acid test with Congo Red test paper. The product may be dried in air at room temperature or in a vacuum oven at 30–50° C. The yield is essentially quantitative.

(b) *Preparation of p-aminophenacyl-trimethylammonium chloride*

A mixture of 249 grams of p-acetaminophenacyl chloride and 650 ml. of an aqueous solution containing 65 grams of trimethylamine is stirred for 16 hours at room temperature and then at 60–65° C. for 2 hours. A small amount of insoluble material is removed by filtration. The filtrate is combined with one-half its volume of concentrated hydrochloric acid (36% by weight) and the resulting solution is heated at the boil for 0.5 hour. The aqueous solution of p-amino-phenacyltrimethylammonium chloride is used as such in the preparation of dyes. The concentration of aromatic amine in the solution can be determined easily by measuring nitrous acid absorption.

Alternatively, the p-acetaminophenacyl chloride can be dissolved in a suitable solvent, such as acetone, and treated with gaseous trimethylamine to effect quaternization. The hydrolysis is effected in 1:2 concentrated hydrochloric acid-water, as described above.

(c) In a similar manner (3-amino-4-methylphenacyl)-trimethylammonium chloride is prepared starting from o-acetotoluide.

(d) In a similar manner (4-amino-2-chlorophenacyl)-trimethylammonium chloride is prepared starting from m-chloroacetanilide.

(e) In a similar manner (4-amino-2,5-dimethylphenacyl)-trimethylammonium chloride is prepared starting from 2,5-dimethylacetanilide.

(f) In a similar manner (3-amino-4-methoxyphenacyl)-trimethylammonium chloride is prepared starting from o-acetaniside.

EXAMPLE X (a) *Preparation of p-acetaminophenacyl-pyridium chloride*

To a solution of 25 grams of p-acetaminophenacyl chloride in 400 ml. of acetone is added 20 ml. of pyridine. The mixture is stirred for 16 hours at the room temperature and is then stirred 3 hours at a gentle reflux. The white crystalline precipitate is isolated by filtration and dried.

(b) Replacement of the pyridine in (a) by 20 ml. of beta-dimethylaminoethanol yields (p-acetaminophenacyl) dimethyl (beta-hydroxyethyl)ammonium chloride as a white crystalline material.

(c) Replacement of the pyridine in (a) by 27 grams of benzyldimethylamine yields (p-acetaminophenacyl) benzyldimethyl ammonium chloride as a white crystalline material.

EXAMPLE XI

*Preparation of (4-amino-3-bromophenacyl) trimethylammonium chloride*

To a well-stirred mixture of 62 grams of p-acetaminophenacyl chloride, 734 grams of glacial acetic acid and 400 grams of water is added a solution of 81 grams of bromine in 315 grams of glacial acetic acid. The addition is carried out over a period of 2–4 hours. Solution is complete at the end of the addition, but the product precipitates gradually as stirring is continued for 16 hours. The mixture is diluted with a solution of 3 grams of sodium bisulfite in 2500 ml. of water, stirred a few minutes, and filtered. The yield of product, after drying at room temperature, is 86 grams. The product is dissolved in 1600 grams of acetone, and the solution is filtered. The filtrate is stirred and saturated with trimethylamine. The precipitate, after isolation by filtration and drying at the room temperature, is a tan microcrystalline material, melting at 215–216° C. The yield is 63 grams. Hydrolysis is effected by heating 28 grams of the quaternary ammonium salt with 200 ml. of water and 177 grams of 35% hydrochloric acid at the boil for 0.5 hour.

EXAMPLE XII

*Preparation of (4-amino-3,5-dibromophenacyl) trimethylammonium chloride*

This preparation is carried out utilizing a modification of the procedure for the preparation of 4-amino-3,5-dibromoacetophenone described by Fuchs, Monatsh., 36, 122 (1915). A solution of 53 grams of p-acetaminophenacyl-trimethylammonium chloride in 450 ml. of 14.6% aqueous hydrochloric acid is heated at the boil for 0.5 hour to hydrolyze the acetyl group. The solution then is cooled to 25° C. and a solution of 103 grams of bromine and 52.4 grams of glacial acetic acid is added slowly over a period of 2 hours. The color of the bromine disappears, and the solution is used as such in the preparation of dyes.

EXAMPLE XIII 100 ml. of an aqueous solution containing 5.2 grams of p-aminophenacyltrimethyl ammonium chloride and 9.0 ml. of 10 N aqueous hydrochloric acid is cooled to 0–5° C., and the amine is diazotized by the addition of 2.0 grams of sodium nitrite (as a 5 N aqueous solution). An excess of nitrous acid is maintained in the mixture for 30 min., and is then destroyed by the addition of a small amount of sulfamic acid. To the solution at 0–5° C. is added 4.4 grams of o-chloro-N-beta-cyanoethyl-aniline in 40 ml. of 10 N aqueous hydrochloric acid during a 5 minute period. The solution is stirred for one hour at 0–5° C. and then for 16 hours at 20–25° C. To this mixture is added 94 grams of sodium acetate and stirring is continued for 30 minutes. The product is removed by filtration and dried at 60–65° C. to yield an orange powder which dissolves readily in warm water to give an orange solution. It dyes "Orlon" acrylic fiber in orange shades from a neutral dye bath at the boil, and has the formula

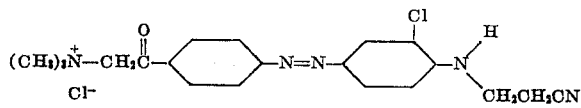

EXAMPLE XIV (a) *Preparation of [2-(p-aminobenzoyl)ethyl] trimethylammonium chloride*

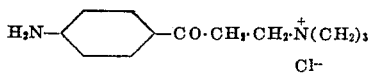

A mixture of 113 grams of anhydrous aluminum chloride and 214 grams of sym.-tetrachloroethane is stirred at temperatures below 35° C. while 31 grams of acetanilide are added in small portions. To this mixture 48 grams of beta-chloropropionyl chloride are added below 40° C. The resulting mixture is heated gradually to 60° C. and stirred at 60–65° C. for two hours. The reaction mass is drowned in 1700 grams of ice and water keeping the temperature below 20° C. The product is filtered off and washed with cold water until essentially free of sym.-tetrachloroethane and the washings are no longer acid to Congo Red test paper. The washed filter cake is mixed with 50 ml. water and 58 grams of an aqueous solution containing 19.3 grams of trimethylamine. The mixture is heated to 60° C. in one hour and held at 60–65° C. for 2 hours. 66 ml. of concentrated hydrochloric acid (36% by weight) are added and the resulting solution heated to 103° to 107° C. for ½ hour, distilling out a small amount of tetrachloroethane to attain this temperature. The resulting solution of [2-(p-aminobenzoyl)ethyl]trimethylammonium chloride is used as such in the preparation of dyes, the concentration of aromatic amine being determined by nitrite absorption.

(b) *Preparation of the azo dye*

125 ml. of an aqueous solution containing 9.6 grams of [2-(p-aminobenzoyl)-ethyl]trimethyl-ammonium chloride and 10 ml. of concentrated hydrochloric acid is cooled by ice to 0–5° C. and the amine is diazotized by adding 2.75 grams of sodium nitrite (as a 34.5% aqueous solution). An excess of nitrous acid is maintained for 30 minutes and is then removed by the addition of a small amount of sulfamic acid. To the diazo solution is added 6.5 grams N,N-diethyl-m-toluidine and the mixture is stirred at 0–10° C. for 4 hours. 5 grams of sodium acetate trihydrate are added and the mixture is stirred without cooling for 16 hours. The color is then precipitated by adding 10 grams of sodium acetate trihydrate as a 25% aqueous solution. The color is filtered off, washed with 10% salt solution and dried at 75° C. The product is obtained as a brittle mass which gives a brownish powder on grinding. It dyes "Orlon" acrylic fiber in red shades and has the formula

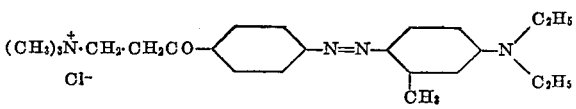

(c) The replacement of the [2-(p-aminobenzoyl)ethyl] trimethylammonium chloride of Ex. XIV (b) with 13 grams of [3-(p-aminobenzoyl)propyl]triethylammonium bromide gives an "Orlon" dye of similar shade. Said ammonium bromide compound is represented by the formula

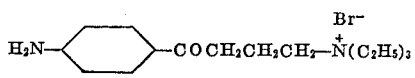

This intermediate is prepared by the method disclosed by W. H. Linnell and S. V. Vora, The Journal of Pharmacy and Pharmacology, Volume 4, No. 1, pages 62–64, 1952.

(d) When the N,N-diethyl-m-toluidine of part (b) of this example is replaced with 6.4 grams N-(2-cyanoethyl)-N-methylaniline a product is obtained which dyes "Orlon" acrylic fiber in orange shades.

EXAMPLE XV (a) *Preparation of (p-amino-alpha-methyl phenacyl) trimethylammonium chloride*

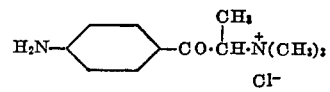

A mixture of 63 grams of anhydrous aluminum chloride and 120 grams sym.-tetrachloroethane is stirred at temperatures below 35° C. while adding 17.2 grams of acetanilide. To this mixture 30 grams of alpha-chloropropionyl chloride are added at temperatures below 20° C. and stirring is continued for several hours allowing the temperature to rise to 24° C. After standing overnight at room temperature (24° C.) the mixture is drowned in 750 grams of an ice-water mixture. The oily layer is separated and washed several times with cold water and finally stirred at 21° C. with 33 grams of an aqueous solution containing 11 grams of trimethylamine. The temperature rises to 32° C. The solution is heated in ½ hour to 60° C. and maintained at 60–65° C. for 1 hour. 37 ml. of concentrated hydrochloric acid are added and the sym.-tetrachloroethane is removed by steam distillation. The clear aqueous solution of (p-amino-alpha-methyl phenacyl)trimethylammonium chloride which remains is diluted with water to 500 ml. and is used as such in the preparation of dyes.

(b) *Preparation of the azo dye*

125 ml. of the aqueous solution obtained in part (a) of this example and containing 15.3 grams of (p-amino-alpha-methylphenacyl)trimethylammonium chloride and 10 ml. concentrated hydrochloric acid is cooled by ice to 0.5° C. and the amine is diazotized by adding 4.35 grams sodium nitrite (as a 34.5% aqueous solution). An excess of nitrite is maintained for 30 minutes and is then removed by the addition of a small amount of sulfamic acid. To the diazo solution are added 10.3 grams of N,N-diethyl-m-toluidine and the mixture is stirred at 0–10° C. for 4 hours and then is allowed to warm to room temperature (24° C.) in 12 hours. 21 grams of sodium acetate trihydrate are added as a 25% aqueous solution to precipitate the color. The product is filtered off, washed with 10% salt solution and dried at 75° C. Said product is obtained in the form of a brown powder and dyes "Orlon" acrylic fiber in red shades and has the formula

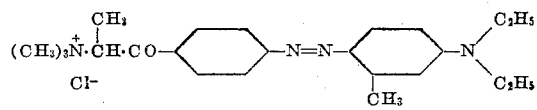

(c) When the N,N-diethyl-m-toluidine of part (b) of this example is replaced with 10.1 grams of N-(2-cyanoethyl) N-methylaniline a product is obtained which dyes "Orlon" acrylic fiber in orange shades.

EXAMPLE XVI (a) The coupling component, 4-(N-methylanilino)butanone-2, is prepared by adding, during 2.5 hours, 82.3 grams of methyl vinyl ketone (as an 85% aqueous solution) to 107 grams N-methylaniline preheated to 60–65° C. After standing overnight at 22° C. the mixture is refluxed for 30 minutes. The reaction product after distillation in vacuo, weighs 125.5 grams; B. P. range 116–120° C. at 2.5 mm. Hg.

The analyses obtained for C, H and N correspond to those required by the formula

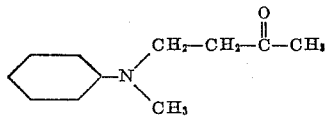

(b) *Preparation of the azo dye*

100 ml. of an aqueous solution containing 6.54 grams of p-aminophenacyltrimethylammonium chloride and 18 cc. concentrated hydrochloric acid is cooled to 0–5° C. and the amine is diazotized by adding 6.1 ml. of 5 N sodium nitrite solution. An excess of nitrous acid is maintained for 20–30 minutes and is then removed by the addition of a small amount of sulfamic acid. To the diazo solution are added 4.9 grams of 4-(N-methylanilino)butanone-2. After 15 minutes, 5.5 grams of sodium acetate trihydrate are added and the mixture is stirred at 0–10° C. for four hours. Two grams of sodium acetate trihydrate are added and the mixture is stirred without cooling for 16–18 hours. Four grams sodium acetate trihydrate are then added and the colored precipitate is filtered off. The precipitate is then washed with 10% salt solution and dried at 70° C. The red-brown product obtained is soluble in water with orange-red coloration. Said product dyes "Orlon" acrylic fiber in orange shades and has the formula.

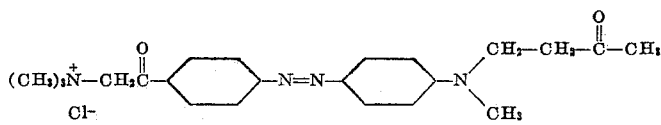

In the above recited examples, the chloride and bromide salts of the dyes have been disclosed; however, it is to be understood that different anions may be obtained in these dyes, of course, either by utilizing another phenacyl derivative (e. g., p-acetaminophenacyl bromide, etc.) for the reaction with a tertiary amine, or by subjecting the phenacyltrimethylammonium chlorides or the dyes prepared therefrom to the usual metathetical reactions. For instance, hydrolysis of the p-acetaminophenacyltrialkylammonium chloride compounds may be carried out by heating in acid as described in Example IX (b), except that the hydrochloric acid medium is replaced by 5 to 10 parts (based on p-acetaminophenacyl chloride) of 4 N sulfuric or phosphoric acid. The resulting solutions of the p-aminophenacyltrialkylammonium sulfates or phosphates can be treated directly with sodium nitrite to effect diazotization of the primary aromatic amines. The diazonium compounds thus obtained can be used directly in the coupling step to provide the final dyes in the form of their ammonium sulfates or phosphates. The nature of the anion in the dye is not critical as long as it renders the dye soluble in water.

Alternatively, products of this invention may be prepared by treating the dyes of the general formula

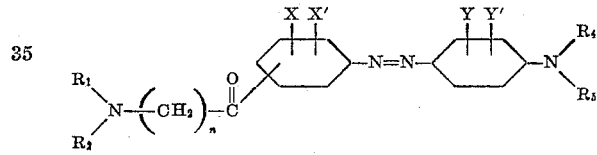

(prepared as described in U. S. Patent 2,206,099) in an alcoholic solution with short chain alkyl chlorides, bromides or sulfates, or with alkyl esters of organic sulfonic acids such as the methyl, ethyl, propyl or butyl ester of p-toluenesulfonic acid, to effect conversion to the quaternary ammonium derivatives. The substituents R, X and Y are defined as on page 2 except $R_1$ and $R_2$ are radicals selected from the group consisting of lower alkyl, hydroxyalkyl and monocyclic aralkyl; n is 1 to 3.

As evidenced by the examples, the products of the present invention are yellow-orange to red-violet in shade when applied to "Orlon" acrylic fiber. The preferred types of dyes from the standpoint of light-fastness are those which are represented by the para structures, i. e.,

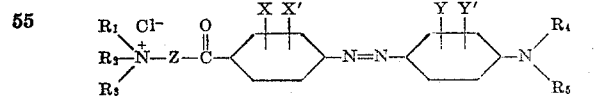

These dyes have an excellent light-fastness rating of from about 5 to 8 on "Orlon" acrylic fiber. These light-fastness ratings are rated on the American Association of Textile Chemists and Colorists' scale of 1 to 8, which is defined in terms of Fadeometer exposure hours before a noticeable break, e. g., No. 1 being 1.25–2.5 hours, No. 2 being 2.5–5 hours, No. 3 being 5–10 hours and doubling with each number up to No. 8 which represents a light-fastness of 160–320 hours.

When the acylammonium radical is in the meta position to the monoazo linkage, it has been found that the resulting dyes have good light-fastness ratings.

The application of the cationic monoazo dyes of the present invention to union fabrics of "Orlon" acrylic fiber and cellulosic fibers is carried out advantageously at 212° F. in a neutral or slightly alkaline (pH 7–9) dye bath at the boil. As much as 1–1.2% of these dyes (on the weight of the "Orlon" fiber present in the mixture) can be applied in this fashion to the "Orlon" fiber with only slight or negligible staining of the cellulosic fiber. Application of these dyes to union fabrics of "Orlon" fiber and wool is carried out advantageously at 212° F. in a dye bath containing 2% glacial acetic acid, 2% sodium acetate (on the weight of the fiber mixture) and 2% (on the weight of the fiber mixture) of a non-ionic surface-active agent, such as Emulphor ON. As much as 1–1.2% of these dyes (on the weight of the "Orlon" fiber present in the mixture) can be applied in this fashion to the "Orlon" fiber alone. These dyes possess the properties of indicators, and when applied to "Orlon" fiber by the above procedure may undergo a shade change, which occurs usually when weak dyeings are prepared, i. e., when the dye represents only 0.1–0.4% of the "Orlon" fiber being dyed. In these cases the shade change can be prevented by including 2–4% (on the weight of the fiber mixture) of a long chain quaternary ammonium salt, such as cetyl trimethyl ammonium bromide in the dye bath.

As many apparently widely different embodiments of this invention may be made without departing from the spirit and scope thereof, it is to be understood that this invention is not limited to the specific embodiments thereof except as defined in the appended claims.

I claim:
1. A water-soluble monoazo dye having the general formula:

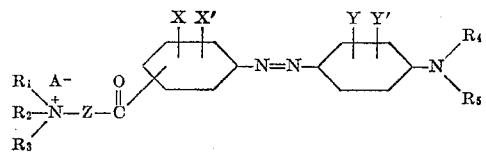

wherein $R_1$ is lower alkyl; $R_2$ is a radical selected from the group consisting of lower alkyl and hydroxyalkyl; $R_3$ is a radical selected from the group consisting of lower alkyl, hydroxyalkyl and monocyclic aralkyl and wherein $R_1$, $R_2$ and $R_3$ together with the contiguous nitrogen atom may represent a monocyclic heterocyclic group; $R_4$ is a radical selected from the group consisting of hydrogen, lower alkyl, ethanol, acetylethyl, beta-cyanoethyl and phenyl; $R_5$ is a radical selected from the group consisting of hydrogen, lower alkyl, ethanol and beta-cyanoethyl; X is a radical selected from the group consisting of hydrogen, lower alkyl, chlorine, bromine and alkoxyl; X' is a radical selected from the group consisting of hydrogen, lower alkyl chlorine and bromine; Y is a radical selected from the group consisting of hydrogen, lower alkyl, chlorine, bromine and alkoxyl; Y' is a radical selected from the group consisting of hydrogen and lower alkyl; with the proviso that when $R_1$, $R_2$, $R_3$, $R_4$ and $R_5$ are all methyl radicals at least one of the radicals taken from the group consisting of X, X', Y, and Y' is a radical taken from the group consisting of lower alkyl, alkoxyl, chlorine and bromine; Z is a radical selected from the group consisting of normal and branched alkylene groups having 1 to 3 carbons; A is a water solubilizing anion selected from the group consisting of organic and inorganic anions and wherein the

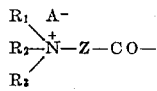

grouping is in meta or para position to the azo linkage.

2. The dye

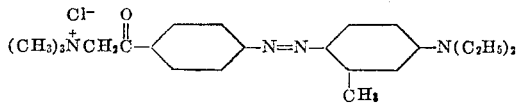

3. The dye

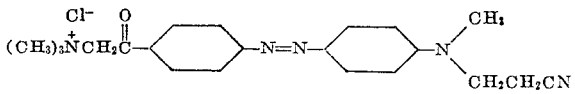

4. The dye

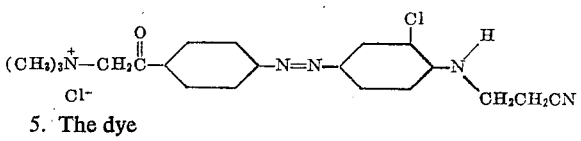

5. The dye

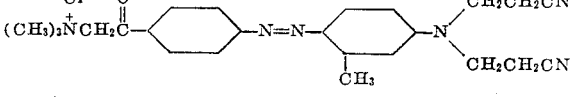

References Cited in the file of this patent
UNITED STATES PATENTS

| | | |
|---|---|---|
| 1,975,160 | Jordan et al. | Oct. 2, 1934 |
| 2,206,099 | McNally et al. | July 2, 1940 |
| 2,359,862 | Linch | Oct. 10, 1944 |
| 2,359,864 | Linch | Oct. 10, 1944 |